Oct. 30, 1923.
R. H. BITTER
1,472,509
SPOTLIGHT MOUNTING
Filed June 24, 1922
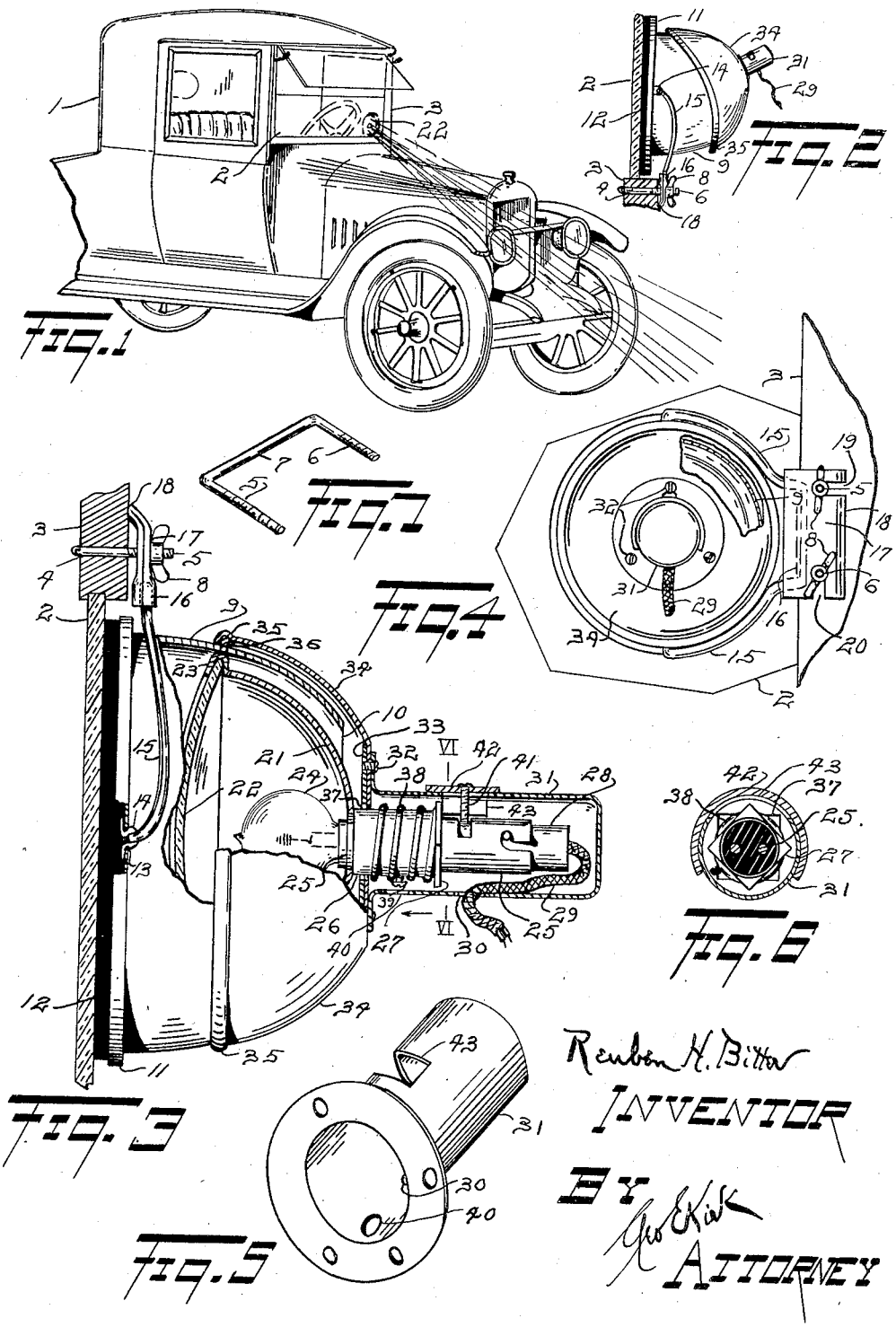

Patented Oct. 30, 1923.

1,472,509

UNITED STATES PATENT OFFICE.

REUBEN H. BITTER, OF TOLEDO, OHIO, ASSIGNOR TO THE THAL & BITTER CO., OF TOLEDO, OHIO, A FIRM.

SPOTLIGHT MOUNTING.

Application filed June 24, 1922. Serial No. 570,622.

*To all whom it may concern:*

Be it known that I, REUBEN H. BITTER, a citizen of the United States of America, residing at Toledo, Lucas County, Ohio, have invented new and useful Spotlight Mountings, of which the following is a specification.

This invention relates to dirigible mountings, more especially for lights.

This invention has utility when incorporated in universal mountings for spotlights, more particularly when disposed back of the windshield in motor vehicles.

Referring to the drawings:—

Fig. 1 is a perspective view of a vehicle embodying a spot-light mounting of the invention herewith, a part of the vehicle being broken away;

Fig. 2 is a side elevation, in detail, of the spot-light mounting, showing an adjusted position thereof;

Fig. 3 is a side elevation, with parts broken away, and on an enlarged scale, showing features of construction of the mounting and spot-light;

Fig. 4 is a back view, with parts broken away, of the spot-light of Fig. 3;

Fig. 5 is a detail view, in perspective, of the handle portion of the spot-light mounting;

Fig. 6 is section on the line VI—VI, Fig. 3, looking in the direction of the arrow; and Fig. 7 is a detail view of the mounting U-bolt or anchor for the bail of the spot-light.

Motor vehicle 1 is shown as provided with windshield 2 having frame 3. Through a desired portion of this frame 3, either bottom, side or top, which may be more convenient, there is shown a pair of holes 4 in parallel relation, through which may be inserted legs 5, 6, connected by outward cross portion 7 of a U-bolt member having the inner or free ends of the legs 5, 6, carrying wing nuts 8.

Zone member 8 is shown as having its smaller portion provided with an opening 10. The larger diameter portion of this zone member 9 is shown as carrying an outwardly extending flange 11 as a seat for a packing 12, herein shown as of rubber. In diametrically disposed position, this projecting flange 11 of the first mounting zone member 9 is provided with openings 13 through which may extend staples or eyes 14 to form hinge bearings for bail arms 15, one continuous with the other by interconnecting plate embraced portion 16 engaged by folded plate or strap 17 having the remote or free outer edge 18 thereof somewhat inwardly bent, whereby, when the respective legs 5, 6, of the mounting U-bolt 5, 6, 7, enter the slots 19, 20, the wing nuts 8 may draw the plate 17 so that the bail arms 15 are flexed or form springs for yieldably holding the first zone member 9 so that its rubber packing or gasket 12 is snugly in position against the windshield 2.

To be introduced into the larger or front end of the zone member 9 when it is unmounted, is reflector 21 which may have mounted in the front thereof a lens 22 seated in a rib 23 of the larger diameter portion of this reflector 21. Centrally of this reflector 21 is disposed a lamp 24 as mounted in a lamp terminal 25. Fixed with the reflector 21 is a rearwardly extending sleeve 26 terminating in a square flange 27. A plug 28 may connect with the terminal 25 and thereby provide electrical connection by way of lead 29 which lead 29 may pass out by opening 30 laterally of tubular handle 31 as an extension connected by screws 32 to plate 33 rigid with a zone member 34. This zone member 34 being rigid with tubular member 31 has its larger diameter portion form a bead 35 in which may be mounted a gasket or packing 36 say of braid. In the inner or smaller portion this zone member 34 is shown as having a rectangular opening 37 therethrough, herein shown as square, just slightly larger than the square flange 27 so that when they are in registry with each other, one may be so that the other may slide therethrough. As so assembled with this sleeve 26 protruding through the opening 37, a helical compression spring 38 may be mounted between the inner portion of the zone member 34 and this flange 27, thereby normally urging the gasket 36 towards the rib 23 and embracing therebetween the first or mounting zone member 9 of the universal joint zone members or mounting means 9, 34, of this spot-light mounting device.

A set screw 39 through the sleeve 26 serves to permit adjustment for focusing of the terminal 25 of the lamp 24 as to the reflector 21. Access to this adusting set screw 39 is by way of opening 40 in the handle 31 of the tubular projection rigid with the second or supplementary zone member 34. This tubular handle mounting 31 from the second zone member 34 also carries a switch control exteriorly accessible. The lamp terminal 25 has radially protruding therefrom a switch arm 41 which is shown as being connected to cover plate 42 as a shield or closure for slot 43 in the side of the handle 31 remote from the adjusting screw opening 40 and the lead outlet opening 30. By rocking this closure or shield 42 clockwise, the light 24 has its filmament illuminated and by counter-clockwise rocking of this shield or closure 42, the circuit is cut off and darkens the lamp 24. The width of this slot 43 is such that the adjustment for focusing is permitted. The zone member 9, as the inner member of the zone pair mounting the lamp, is the one herein shown as supported and yieldably urged into position against the windshield. Each zone member 9 and 34 has its larger diameter portion toward the windshield. These zone members are of dome form and together provide hollow ball joint sections in a tubular universal joint as herein disclosed. Furthermore, this zone member 9 and the zone member 34 have their curvature centers coincident. This center lies approximately in the plane of the larger diameter portion of the zone member 34. This center as to the member 9 is spaced from the flange 11. There is thus provided a forward extension from this center of curvature of the member 9 over which extension the zone 34 may rock in directing the lamp 24. Accordingly this extension portion of the member 9 has its diameter approximate the diameter of the member 9 at the center of curvature of such member 9 as a maximum. While the outer wall of the member 9 throughout its extent determines curvature center, the curvature center as to the member 34 is really determined by its bearing through packing 36 with the member 9, which packing may be yieldable to allow for some variation. The center of curvature for the inner side of the member 9 has the bead or rib 23 of the lamp housing coact therewith, and the spring 38 is sufficiently yielding to take care of slight irregularities. These members 9, 34, of curved zone form provide a casing, and due to the clearance of the member 34 back from the forward edge of the member 9, there is range for angular tilting for fully covering traffic demands forwardly of a motor vehicle. Furthermore, as the casing member 34 maximum diameter approximates the maximum diameter of the casing member 9, the structure is one not obstructing a windshield, but only approximates the reflector in size.

There is accordingly provided in this disclosure herein a most compact light weight mounting accessible directly from inside the vehicle and one which may be readily directed in any position required in driving forwardly. Additionally, by simply loosening the wing nuts 8, the bail and spot-light complete may be disconnected and with the lead 29 long enough, it may be used as a trouble light or for any purpose in and about the vehicle.

The disposal of the notches 19, 20, in intersecting directions makes it possible to effect proper and adequate mounting of the spot-light by a single type of structure whether bottom, side or top relation or upon either side of the vehicle which may be found convenient or desirable in practice. Accordingly this spot-light is not only universal as to its manipulation but universal as to its mounting possibilities and really universal in its use.

What is claimed and it is desired to secure by Letters Patent is:—

1. A lamp provided with a reflector and having a sleeve terminating in a flange, a first mounting zone member embracing the reflector, a second supplementary zone member embracing said first zone mounting member and having a tubular portion in which the sleeve extends and provided with a flange adjacent the reflector opposing the sleeve flange, and a spring between the flanges for clamping reflector and second zone member upon the first zone member.

2. A universal spot-light mounting including a zone member having a tubular handle, a sleeve in the handle, a lamp terminal carried by the sleeve, and a set screw for holding the terminal in focusing adjustment as to the sleeve, said handle being provided with an opening for access to the set screw.

3. In a tubular universal joint a hollow dome shaped casing, a bail mounting therefor comprising spring arms extending to terminate on opposite sides of the middle portion of the casing and there pivotally connected to said casing, and arm flexing means for anchoring the bale to thrust the arms into holding position for the casing.

4. A windshield, a tubular universal joint, a light mounted by the joint and directable toward the windshield, said joint embodying a mounting member of hollow dome shape, a bail for mounting the member comprising arms extending to terminate on opposite sides of a larger diameter portion of the member, an arm engaging mounting plate, an adjustable means coacting with the plate to thrust the arms toward the windshield and thereby effect holding of said member into seating relation against the windshield.

5. A windshield, a frame therefor, a tubular universal joint, a light mounted by the joint and directable toward the windshield, said joint embodying a hollow dome shaped member, a mounting wire for the member having a pair of ends spaced apart to provide spring arms extending to terminate on opposite sides of the middle portion of the larger diameter section of the member in rocking relation therewith, a mounting plate coacting with said wire, and engaging means coacting with the plate for flexing the wire to effect rocking of the arms as to the member in yieldably thrusting and holding the member against the windshield.

6. A bracket embodying a first curved zone member, a lamp provided with a housing and a terminal, a second supplementing curved zone member, and a lamp terminal housing tube held rigid with the lamp terminal and the second member, said second member and the lamp housing embracing the first zone member, said zone members having a common center of curvature, and said first zone member having a forward extension beyond said center of curvature as a housing over which the second zone member may rock.

7. A bracket embodying a first curved zone member, a second supplementing outer curved zone member, an outwardly protruding tubular portion rigid with the second zone member, and a lamp carried by the second zone member within the first zone member and provided with a terminal housed by the protruding tubular portion, said first zone member having its center of curvature approximate the plane of the larger diameter portion of the second zone member.

8. A bracket embodying a first curved zone member, a second supplementing curved zone member, an outwardly protruding tubular portion rigid with the second zone member to provide a handle, a light carried within the first zone member by the second zone member and provided with a terminal having a switch, and control means from exterior of the handle for the switch, said zone members having a common center of curvature forwardly of which the first zone member extends as a section having as its maximum diameter its diameter through said center of curvature.

9. A bracket embodying a first curved zone member, a second supplementing outer curved zone member, an outwardly protruding tubular portion rigid with the second zone member to provide a handle, and a lamp carried within the first zone member by the second zone member, said second zone member having its center of curvature forwardly of which the first zone member extends with the diameter of the second zone member at said center of curvature as a maximum for said extension.

In witness whereof I affix my signature.

REUBEN H. BITTER.